United States Patent
Zhong

(10) Patent No.: US 9,715,632 B2
(45) Date of Patent: Jul. 25, 2017

(54) INTERSECTION RECOGNIZING APPARATUS AND COMPUTER-READABLE STORAGE MEDIUM

(71) Applicant: Wei Zhong, Kanagawa (JP)

(72) Inventor: Wei Zhong, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 504 days.

(21) Appl. No.: 14/202,406

(22) Filed: Mar. 10, 2014

(65) Prior Publication Data
US 2014/0267630 A1    Sep. 18, 2014

(30) Foreign Application Priority Data

Mar. 15, 2013  (JP) ................. 2013-054422

(51) Int. Cl.
*H04N 13/02*    (2006.01)
*H04N 7/18*     (2006.01)
*G06K 9/00*     (2006.01)

(52) U.S. Cl.
CPC ..... *G06K 9/00798* (2013.01); *H04N 13/0203* (2013.01)

(58) Field of Classification Search
None
See application file for complete search history.

(56) References Cited

U.S. PATENT DOCUMENTS 5,826,212 A * 10/1998 Nagai ............... G01C 21/3638
                                                    340/990
6,985,619 B1 * 1/2006 Seta .................... G06K 9/00798
                                                    345/419
8,306,747 B1 * 11/2012 Gagarin ................. G01C 7/04
                                                    701/408
(Continued)

FOREIGN PATENT DOCUMENTS

JP    2000-276228 A    10/2000
JP    4613738          10/2010
(Continued)

OTHER PUBLICATIONS

Lutzeler, M. et al., "EMS-Vision: Recognition of Intersections on Unmarked Road Networks," Intelligent Vehicles Symposium, pp. 302-307, Oct. 3, 2000.
(Continued)

*Primary Examiner* — Jorge L Ortiz Criado
*Assistant Examiner* — Samuel D Fereja
(74) *Attorney, Agent, or Firm* — Harness, Dickey & Pierce, P.L.C.

(57) ABSTRACT

An intersection recognizing apparatus includes a stereo image obtaining unit configured to obtain a stereo image by capturing a forward image in a street by a stereo camera; a parallax image generator configured to generate a parallax image based on the stereo image obtained by the stereo image obtaining unit; a parallax map generator configured to generate a parallax map based on the parallax image; a feature data storage unit configured to store feature data of
(Continued)

an intersection road shoulder width regarding a road surface; and a recognition processing calculation unit configured to recognize an intersection condition based on the parallax map and the feature data of the intersection road shoulder width.

13 Claims, 7 Drawing Sheets

(56) References Cited

U.S. PATENT DOCUMENTS

| | | | | |
|---|---|---|---|---|
| 2002/0061132 A1* | 5/2002 | Furukawa | ............ | G06K 9/0063 382/154 |
| 2004/0264763 A1* | 12/2004 | Mas | ............ | G01C 23/00 382/154 |
| 2008/0273751 A1* | 11/2008 | Yuan | ............ | G06K 9/32 382/103 |
| 2009/0041337 A1* | 2/2009 | Nakano | ............ | G06K 9/00798 382/154 |
| 2009/0303077 A1* | 12/2009 | Onome | ............ | G08G 1/096716 340/901 |
| 2010/0274478 A1* | 10/2010 | Takahashi | ............ | G01C 21/30 701/533 |
| 2011/0255741 A1* | 10/2011 | Jung | ............ | G06K 9/00369 382/103 |
| 2012/0026332 A1* | 2/2012 | Hammarstrom | ............ | G06T 7/0075 348/148 |
| 2012/0155747 A1* | 6/2012 | Hwang | ............ | G06T 7/0075 382/154 |
| 2012/0224069 A1* | 9/2012 | Aoki | ............ | G01B 11/026 348/187 |
| 2012/0242835 A1 | 9/2012 | Li et al. | | |
| 2012/0288191 A1* | 11/2012 | Kido | ............ | G06K 9/4652 382/165 |
| 2012/0294482 A1* | 11/2012 | Kasaoki | ............ | G06K 9/4647 382/103 |
| 2012/0294485 A1* | 11/2012 | Kasaoki | ............ | G06K 9/00805 382/103 |
| 2013/0034296 A1* | 2/2013 | Hattori | ............ | G06T 7/0075 382/154 |
| 2013/0129148 A1* | 5/2013 | Nanri | ............ | G01C 21/3602 382/103 |
| 2013/0223689 A1* | 8/2013 | Saito | ............ | G06K 9/00791 382/104 |
| 2014/0320644 A1* | 10/2014 | Hegemann | ............ | G06K 9/00798 348/140 |

FOREIGN PATENT DOCUMENTS

| | | |
|---|---|---|
| JP | 2011-145892 A | 7/2011 |
| JP | 2011-150689 | 8/2011 |
| WO | WO-2007/102065 A1 | 9/2007 |

OTHER PUBLICATIONS

Buch, N. et al., "A Review of Computer Vision Techniques for Analysis of Urban Traffic," IEEE Transactions on Intelligent Transportation Systems, vol. 12, No. 3, pp. 920-939, Sep. 1, 2011.
Extended European Search Report dated Jun. 23, 2014.
Office Action dated Nov. 22, 2016 for corresponding Japanese Application No. 2013054422.

* cited by examiner

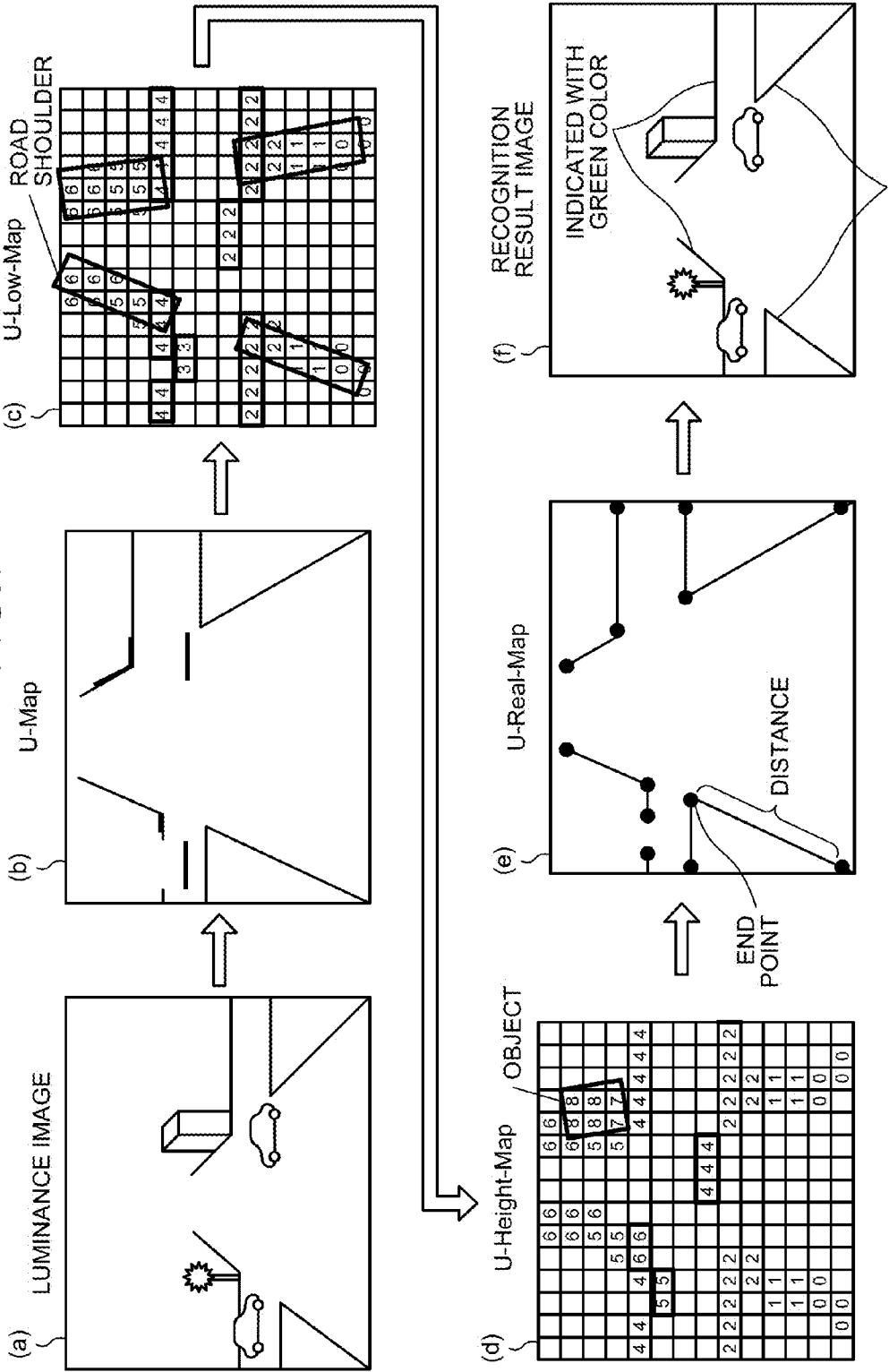

INTERSECTION RECOGNIZING APPARATUS AND COMPUTER-READABLE STORAGE MEDIUM

CROSS-REFERENCE TO RELATED APPLICATION

The present application claims priority to and incorporates by reference the entire contents of Japanese Patent Application No. 2013-054422 filed in Japan on Mar. 15, 2013.

BACKGROUND OF THE INVENTION

1. Field of the Invention

The present invention relates to an intersection recognizing apparatus and a computer-readable storage medium.

2. Description of the Related Art

In recent years, a driving support system utilizing an in-vehicle camera has been put into practical use to improve a safety and a convenience of an automobile. In such a driving support system, it is highly significant for realizing functions including a collision avoidance to recognize an intersection in a space for vehicle driving. Recently, a driving support system utilizing a stereo camera has been studied a lot since a stereo camera allows obtaining not only visual information but also distance information.

In a conventional method for recognizing an intersection, an inroad of a vehicle into an intersection is recognized by presupposing the existence of a crossing vehicle around the intersection, recognizing a crossing vehicle based on a luminance image captured by a camera, and obtaining a distance to the crossing vehicle by a radar device. There is a problem of having a difficulty in real time processing with a complicated system configuration in a case where an intersection with no crossing vehicle cannot be recognized.

In Japanese Patent No. 4613738, for example, an imaging device and a radar device are attached at predetermined locations in a vehicle for the purpose of accurately determining an intersection condition, an image recognition processing is performed on a luminance image obtained by the imaging device that captures a forward image of the vehicle, and a crossing vehicle that moves in the intersection is detected as a candidate vehicle. Then, a distance to the detected candidate vehicle is obtained by the radar device and an inroad of the vehicle into the intersection is recognized.

However, since the existence of a vehicle is presupposed for the recognition of the intersection condition and information of the distance to the detected crossing vehicle is obtained by the radar device, there is a problem in Japanese Patent No. 4613738 in that realization of real time performance is difficult with a complicated system configuration in the case where an intersection with no crossing vehicle cannot be recognized.

Therefore, there is a need for an intersection recognizing apparatus capable of precisely recognizing an intersection with a simple configuration and a computer-readable storage medium.

SUMMARY OF THE INVENTION

It is an object of the present invention to at least partially solve the problems in the conventional technology.

According to an embodiment, there is provided an intersection recognizing apparatus that includes a stereo image obtaining unit configured to obtain a stereo image by capturing a forward image in a street by a stereo camera; a parallax image generator configured to generate a parallax image based on the stereo image obtained by the stereo image obtaining unit; a parallax map generator configured to generate a parallax map based on the parallax image; a feature data storage unit configured to store feature data of an intersection road shoulder width regarding a road surface; and a recognition processing calculation unit configured to recognize an intersection condition based on the parallax map and the feature data of the intersection road shoulder width.

According to another embodiment, there is provided a non-transitory computer-readable storage medium with an executable program stored thereon and executed by a computer. The program instructs the computer to perform: generating a parallax image based on a stereo image obtained by capturing a forward image in a street by a stereo image obtaining unit; generating a parallax map based on the parallax image; and recognizing an intersection condition based on the parallax map and feature data of an intersection road shoulder width regarding a road surface, the feature data being stored in a storage unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is an explanatory view of an example of intersection recognition.

DETAILED DESCRIPTION OF THE PREFERRED EMBODIMENTS

Embodiment

An intersection recognizing apparatus and a computer-readable storage medium according to an embodiment will be explained below. While constituent elements of the present invention are generally illustrated in the accompanying drawings of the description, it is easily understood that the elements can be arranged and designed in a wide variety of configurations. Therefore, a detailed explanation below regarding an embodiment of an apparatus, a method, and a computer-readable storage medium storing therein a program will not limit the scope of the present invention specified by the appended claims, one exemplary embodiment selected in the present invention is only shown, and one selected embodiment with regard to an apparatus, a system, and a method is just shown in consistency with the present invention specified by the appended claims of the description. It is understood that one skilled in the art can realize the present invention even without at least one specific item or even with another method, component, and material.

Figure 1:
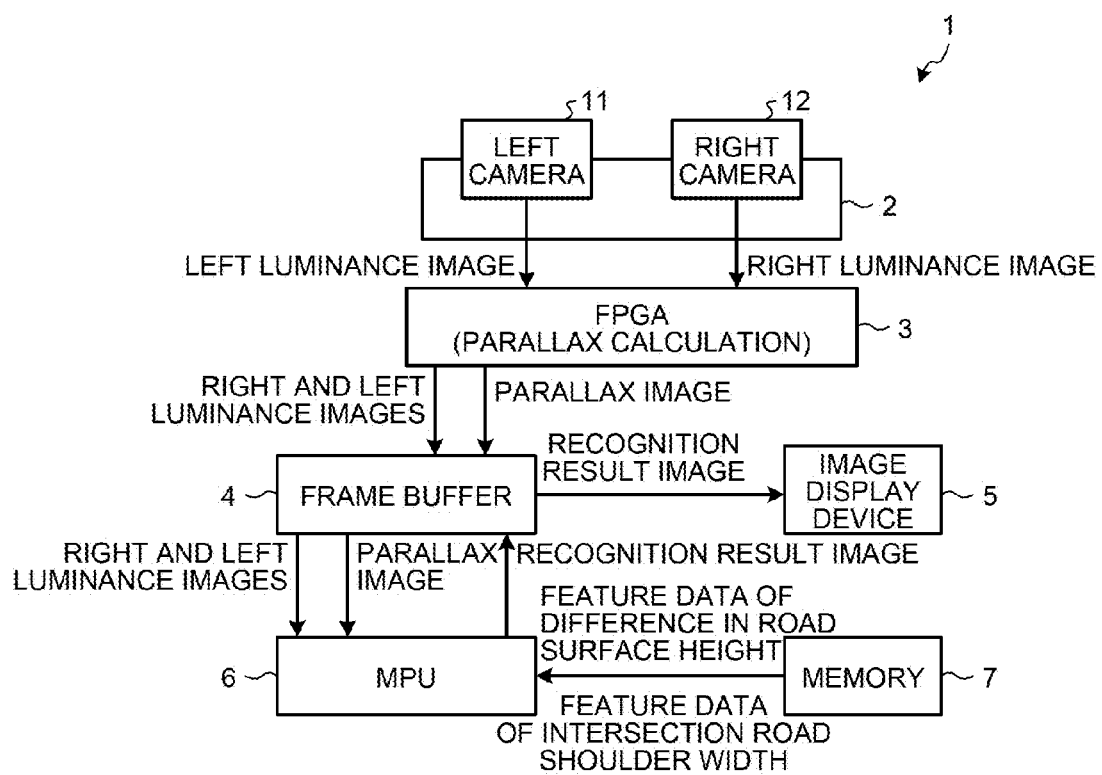
FIG. 1 illustrates a simple overview of an example of a hardware configuration of an intersection recognizing apparatus according to an embodiment.

An intersection recognizing apparatus according to an embodiment can be used for a vehicle installation. FIG. 1 illustrates a simple overview of an example of a hardware configuration of an intersection recognizing apparatus according to an embodiment. An intersection recognizing apparatus 1 is provided with an imaging unit 2, an FPGA (parallax calculation) 3, a frame buffer 4, an image display device 5, a micro processing unit (MPU) 6, and a memory 7, as illustrated in FIG. 1.

The imaging unit 2 includes right and left cameras (stereo cameras) 11 and 12 attached in parallel at right and left sides, capture a forward image in a street by the right and left cameras 11 and 12, and outputs stereo images (right and left luminance images) to the FPGA 3. Each camera is formed by a lens, an imaging element, and the like. The FPGA 3 calculates a parallax image (parallax data) at high speed from the stereo images obtained by the imaging unit 2 and stores the parallax image and the right and left luminance images in the frame buffer 4.

The frame buffer 4 stores the parallax image, the right and left luminance images, an image of a result of recognition in an intersection recognition processing, and the like. The image display device 5 displays the image of the recognition result of the intersection recognition processing and a camera image. The memory 7 stores feature data of difference in road surface height and feature data of intersection road shoulder width regarding a road surface as a detection target, both feature data being used for the intersection recognition processing. The MPU 6 performs the intersection recognition processing based on the parallax image, and the feature data of difference in road surface height and the feature data of intersection road shoulder width stored in the memory 7.

Figure 2:
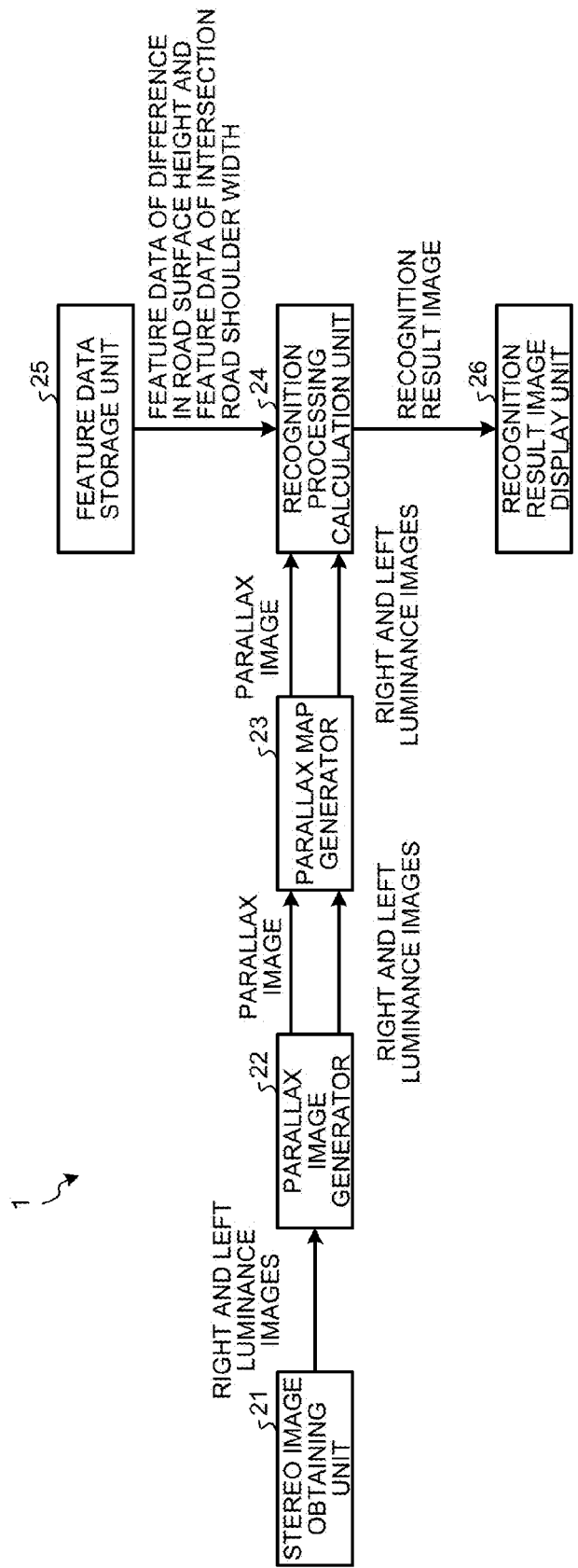
FIG. 2 illustrates an example of a functional configuration of the intersection recognizing apparatus 1 according to the embodiment.
Figure 3:
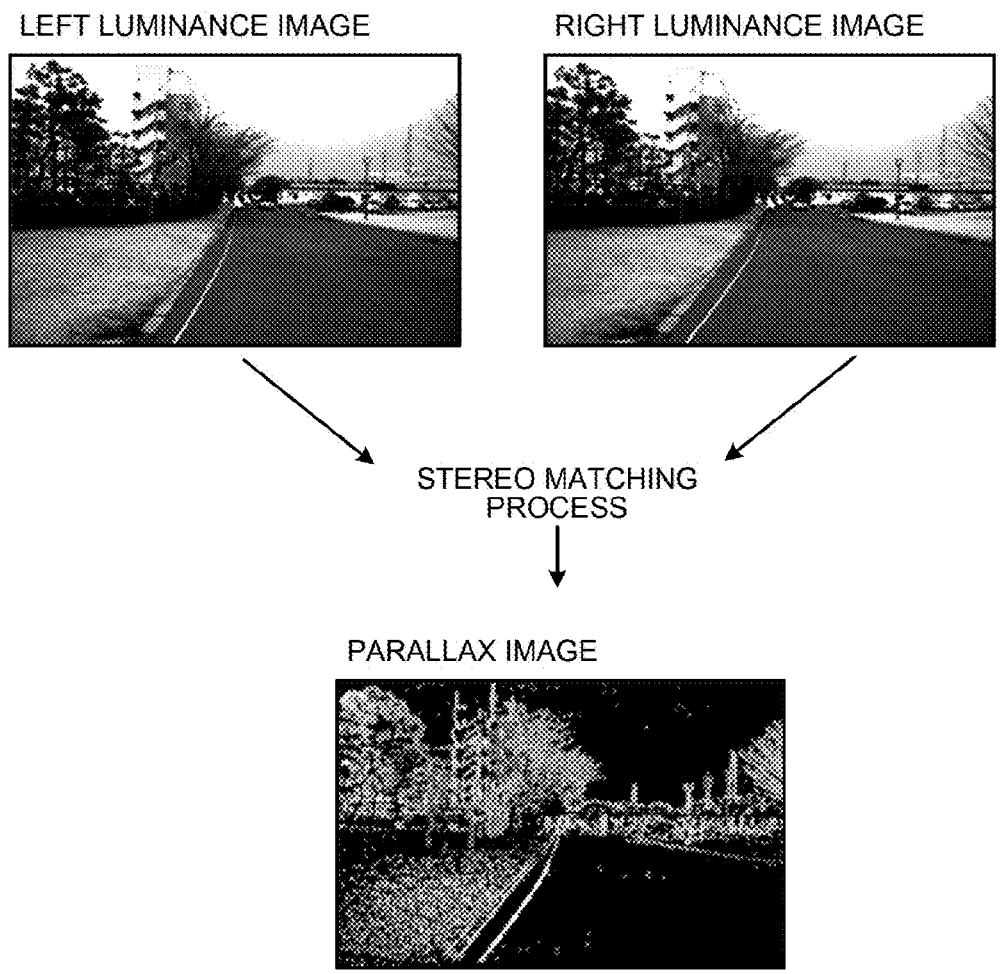
FIG. 3 is an explanatory view of right and left luminance images and a parallax image.
Figure 4:
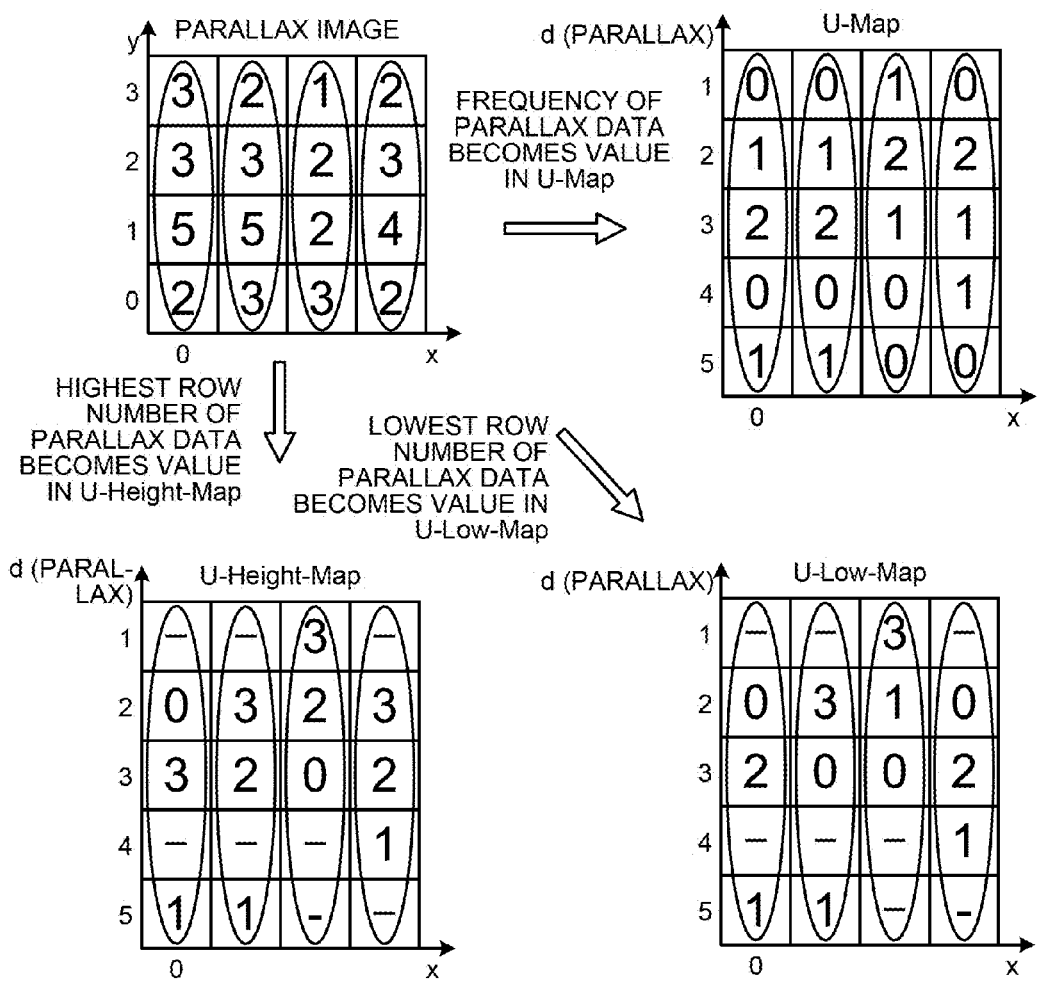
FIG. 4 is an explanatory view of a relation of a parallax image with a U-Map, a U-Height-Map, and a U-Low-Map.

FIG. 2 illustrates an example of a functional configuration of the intersection recognizing apparatus 1 according to the embodiment. FIG. 3 is an explanatory view of one example of right and left luminance images and a parallax image. FIG. 4 illustrates a relation of a parallax image with a U-Map (first map), a U-Height-Map (second map), and a U-Low-Map (third map).

As illustrated in FIG. 2, the intersection recognizing apparatus 1 is provided with a stereo image obtaining unit 21, a parallax image generator 22, a parallax map generator 23, a recognition processing calculation unit 24, a feature data storage unit 25, and a recognition result image display unit 26.

The stereo image obtaining unit 21 captures a forward image in a street by right and left cameras (stereo cameras) attached in parallel at a front side of the vehicle to obtain right and left luminance images (stereo images) and outputs the right and left luminance images to the parallax image generator 22.

The parallax image generator 22 performs a stereo matching process of the right and left luminance images input from the stereo image obtaining unit 21 to generate a parallax image. The parallax image generator 22 outputs the right and left luminance images and the generated parallax image to the parallax map generator 23. More specifically, the parallax image generator 22 detects sectional images corresponding to each other between the right and the left luminance images (stereo matching process) and generates a parallax image formed of a parallax between the sectional images.

FIG. 3 illustrates one example of the right and left luminance images and the parallax image, in which the parallax image is generated by performing the stereo matching process on the right luminance image and the left luminance image.

The feature data storage unit 25 stores the feature data of difference in road surface height and the feature data of intersection road shoulder width regarding the road surface as a detection target. The feature data of difference in road surface height is used as a reference for determining a road shoulder and an object. The feature data of intersection road shoulder width is used as a reference for determining whether or not an intersection is present between end points of the road shoulder.

The parallax map generator 23 generates a parallax map based on parallax data on the parallax image. The parallax map includes a U-Map which shows a histogram (frequency) of the parallax data in an X direction of the parallax image, a U-Height-Map which shows a maximum height of the parallax data in the X direction of the parallax image, and a U-Low-Map which shows a minimum height of the parallax data in the X direction of the parallax image, for example.

As illustrated in FIG. 4, the parallax image is defined by parallax data in the X direction and Y direction, and what is defined by the frequency of the parallax data of the parallax image with regard to the X direction (by how many times the parallax data in the X direction occurs) becomes a value of the U-Map. The highest row number of the parallax data becomes a value of the U-Height-Map. The lowest row number of the parallax data becomes a value of the U-Low-Map.

The recognition processing calculation unit 24 performs an intersection recognition processing based on the parallax map (U-Map, U-Height-Map, and U-Low-Map), and the feature data of difference in road surface height and the feature data of intersection road shoulder width stored in the feature data storage unit 25. Specifically, the recognition processing calculation unit 24 tentatively recognize road shoulders on the U-Low-Map based on lines extracted on the U-Map, eliminates an object recognized on the U-Height-Map from road shoulders tentatively recognized on the U-Low-Map, generates a U-Real-Map (real map), extracts end points on the U-Real-Map, and recognizes an intersection by comparing a distance between the extracted end points and the feature data of intersection road shoulder width.

The recognition result image display unit 26 displays images of various kinds from the cameras and a recognition result image of the intersection recognition processing (image on which a line, a frame, and the like are superimposed to display the intersection road shoulder).

Figure 5:
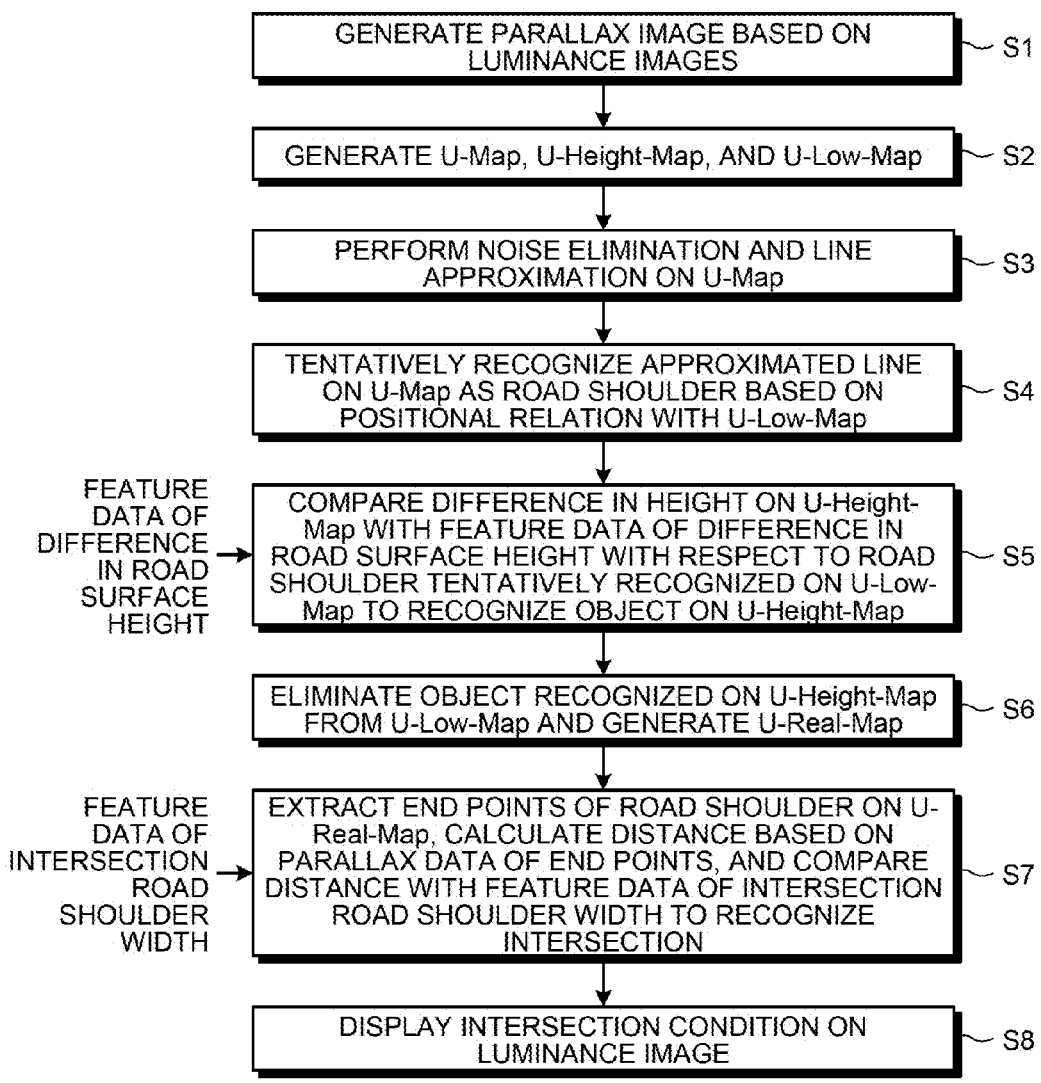
FIG. 5 is a flowchart for explaining an intersection recognition processing.
Figure 6:
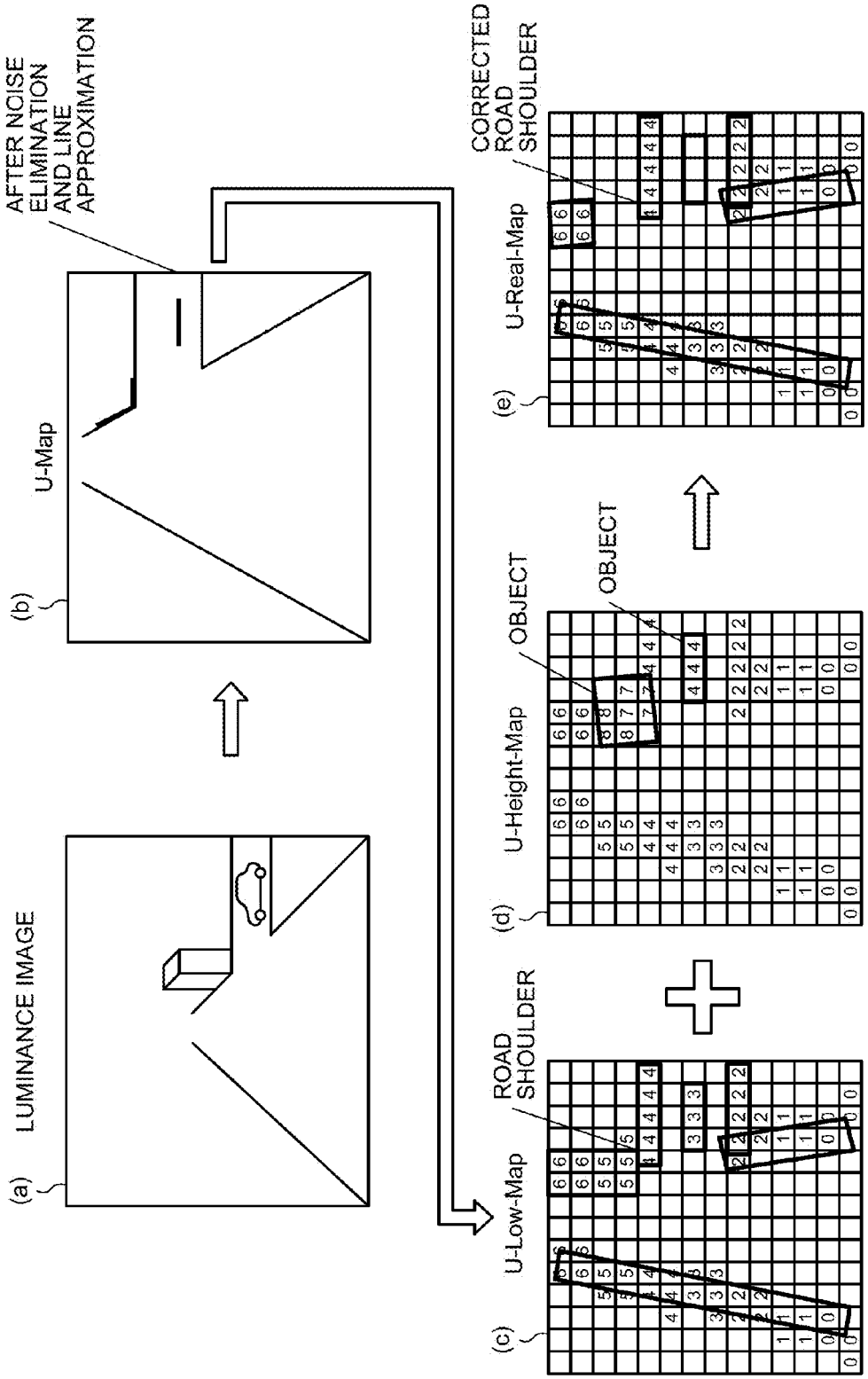
FIG. 6 is an explanatory view of a relation of a luminance image with a U-Map, a U-Low-Map, a U-Height-Map, and a U-Real-Map.

FIG. 5 is a flowchart for explaining a procedure of the intersection recognition processing in the intersection recognizing apparatus 1 configured as illustrated in FIG. 2. FIG. 6 illustrates an example of a relation of a luminance image with the U-Map, U-Height-Map, U-Low-Map, and U-Real-Map. FIG. 7 is an explanatory view of a specific example of the intersection recognition processing. The intersection recognition processing in the intersection recognizing apparatus 1 will be explained with reference to FIGS. 6 and 7 in accordance with the flowchart in FIG. 5.

In FIG. 5, the parallax image generator 22 generates a parallax image based on the right and left luminance images illustrated in (a) of FIG. 6 and (a) of FIG. 7 captured by the stereo image obtaining unit 21 (step S1). The parallax map generator 23 generates a parallax map (U-Map, U-Height-Map, and U-Low-Map) based on the parallax image (step S2).

The recognition processing calculation unit 24 eliminates noises and extracts lines from the U-Map illustrated in (b) of FIG. 6 and (b) of FIG. 7 (step S3). Specifically, a straight line approximation processing by the least square method or the Hough transform processing is performed to extract lines, for example.

The recognition processing calculation unit 24 performs a tentative recognition of a road shoulder on the U-Low-Map based on the lines extracted on the U-Map (step S4). Specifically, every line extracted on the U-Low-Map is tentatively recognized as a road shoulder as the first step, as illustrated in (c) of FIG. 6 and (c) of FIG. 7, for example.

With respect to every road shoulder tentatively recognized on the U-Low-Map, the recognition processing calculation unit 24 compares a difference in height on the U-Height-Map with the feature data of difference in road surface height stored in the feature data storage unit 25 and recognizes an object on the U-Height-Map as illustrated in (d) of FIG. 6 and (d) of FIG. 7 (step S5). Specifically, a difference between the U-Height-Map and the U-Low-Map is calculated as a difference in height with respect to every road shoulder tentatively recognized. Since distance information can be obtained based on the parallax data, a triangular relation is present with distance and an actual difference in height, and the actual difference in height is directly proportional to the difference in height on the U-Height-Map and the difference in height on the U-Low-Map, it is possible to calculate a distance from parallax data, utilizes difference in height from the distance information, and calculate actual difference in height. When the actual difference in height is larger than the feature data of difference in road surface height, the difference in height is recognized as an object and when the actual difference in height is smaller than the feature data of difference in road surface height, the difference in height is recognized as a road shoulder.

The recognition processing calculation unit 24 eliminates the object recognized on the U-Height-Map from the road shoulders tentatively recognized on the U-Low-Map and generates the U-Real-Map illustrated in (e) of FIG. 6 (step S6). Here, all the lines on the U-Real-Map are assumed to be road shoulders.

The recognition processing calculation unit 24 extracts end points of the lines on the U-Real-Map and calculates distance information between end points based on the parallax data of the end points as illustrated in (e) of FIG. 7. The least square method and the Hough transform processing are performed for the straight line approximation processing. In the Hough transform, a straight line can be detected as a line segment having end points and end point information can thereby be obtained.

The recognition processing calculation unit 24 compares the distance between the end points of the road shoulder calculated on the U-Real-Map with the feature data of intersection road shoulder width to recognize an intersection (step S7). Specifically, when the distance between the end points of the road shoulder is larger than the feature data of intersection road shoulder width, it is recognized as an intersection.

The recognition result image display unit 26 displays the intersection condition illustrated in (f) of FIG. 7 based on a positional relation on the luminance image (step S8). Here, the intersection condition means a determination on how far forward in the driving direction of the vehicle the intersection is present and a condition where the vehicle moves into the intersection. For example, the recognition result image display unit 26 superimposes lines for road shoulders and lines for intersection road shoulders in respectively different colors, red and green in the example illustrated in (f) of FIG. 7, on the luminance image in the display to enable the user to check the intersection.

According to the embodiment as explained so far, the stereo image obtaining unit 21 captures a forward image by stereo cameras to obtain stereo images; the parallax image generator 22 generates a parallax image based on the stereo images captured by the stereo image obtaining unit 21; the parallax map generator 23 generates the parallax map (the U-Map which shows the frequency of the parallax data in the X direction of the parallax image, the U-Height-Map which shows a maximum height of the parallax data in the X direction of the parallax image, and the U-Low-Map which shows a minimum height of the parallax data in the X direction of the parallax image; and the recognition processing calculation unit 24 tentatively recognizes road shoulders on the U-Low-Map based on the lines extracted on the U-Map, eliminates an object recognized on the U-Height-Map from the road shoulders tentatively recognized on the U-Low-Map, generates the U-Real-Map, extracts end points on the U-Real-Map, and compares the distance between the extracted end points with the feature data of intersection road shoulder width to recognize the intersection. It becomes possible according to the present invention to precisely recognize an intersection with a simple configuration even in a case where a crossing vehicle is not present.

Besides, the functions of the constituent elements of the intersection recognizing apparatus may be realized by a computer that executes a program. The program to be executed by the intersection recognizing apparatus is provided by being preloaded in a ROM, not illustrated, and the like.

The program to be executed by the intersection recognizing apparatus may be configured to be recorded in a file of an installable format or of an executable format in a computer-readable storage medium such as a CD-ROM, a flexible disk (FD), a CD-R, and a digital versatile disk (DVD) and provided.

Moreover, the program to be executed by the intersection recognizing apparatus may be configured to be stored on a computer connected to a network such as the Internet, downloaded via the network, and provided.

Furthermore, the program to be executed by the intersection recognizing apparatus may be configured to be provided or distributed via the network such as the Internet.

The program to be executed by the intersection recognizing apparatus has a module configuration including the constituent elements explained above, and for an actual hardware, a CPU (processor) not illustrated in the drawings reads out and executes the program stored in a ROM and the like, the units explained above are loaded on the main storage device, and respective constituent elements are thus generated on the main storage device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An intersection recognizing apparatus, comprising:
a stereo image obtaining unit configured to obtain a stereo image by capturing a forward image in a street by a stereo camera; and
a processor including:
a parallax image generator configured to generate a parallax image based on the stereo image obtained by the stereo image obtaining unit;
a parallax map generator configured to generate a parallax map based on the parallax image;
a feature data storage unit configured to store feature data of an intersection road shoulder width regarding a road surface; and
a recognition processing calculation unit configured to recognize an intersection condition based on the parallax map and the feature data of the intersection road shoulder width to generate a real map,
wherein the parallax map includes a first map that shows a frequency of parallax data in a horizontal direction of the parallax image, a second map that shows a maximum height of the parallax data in the horizontal direction of the parallax image, and a third map that shows a minimum height of the parallax data in the horizontal direction of the parallax image.

2. The intersection recognizing apparatus according to claim 1, wherein
the stereo camera includes two stereo cameras that are attached in parallel at right and left sides to obtain a right stereo image and a left stereo image, respectively, and
the stereo image obtaining unit is configured to obtain the right stereo image and the left stereo image.

3. The intersection recognizing apparatus according to claim 1, wherein the parallax image generator is configured to detect sectional images corresponding to each other between right and left images constituting the stereo image obtained by the stereo image obtaining unit and generate the parallax image formed of a parallax between the detected sectional images.

4. The intersection recognizing apparatus according to claim 1, wherein the recognition processing calculation unit is configured to:
recognize a road shoulder on the third map based on lines extracted on the first map,
eliminate an object recognized on the second map from the road shoulder recognized on the third map,
extract end points on the real map, and
recognize an intersection by comparing a distance between the extracted end points and the feature data of the intersection road shoulder width.

5. The intersection recognizing apparatus according to claim 1, wherein the recognition processing calculation unit is configured to compare 14 difference in height on the second map with the feature data of difference in road surface height stored in the feature data storage unit and configured to recognize an object on the second map.

6. The intersection recognizing apparatus according to claim 5, wherein a difference between the second map and the third map is calculated as a difference in height with respect to every road shoulder recognized.

7. The intersection recognizing apparatus according to claim 5, wherein a triangular relation is present with distance and an actual difference in height,
wherein the actual difference in height is directly proportional to the difference in height on the second map and the difference in height on the third map.

8. The intersection recognizing apparatus according to claim 7, wherein the recognition processing calculation unit is further configured to:
calculate a distance from parallax data,
utilize difference in height from the distance information, and
calculate actual difference in height.

9. The intersection recognizing apparatus according to claim 8, wherein when the actual difference in height is larger than the feature data of difference in road surface height, the difference in height is recognized as an object.

10. The intersection recognizing apparatus according to claim 8, wherein when the actual difference in height is smaller than the feature data of difference in road surface height, the difference in height is recognized as a road shoulder.

11. The intersection recognizing apparatus according to claim 1, further comprising a recognition result image display unit configured to display the intersection condition.

12. A non-transitory computer-readable storage medium with an executable program stored thereon and executed by a computer, wherein the program instructs the computer to perform:
generating a parallax image based on a stereo image obtained by capturing a forward image in a street by a stereo image obtaining unit;
generating a parallax map based on the parallax image; and
recognizing an intersection condition based on the parallax map and feature data of an intersection road shoulder width regarding a road surface to generate a real map, the feature data being stored in a storage unit,
wherein the parallax map includes a first map that shows a frequency of parallax data in a horizontal direction of the parallax image, a second map that shows a maximum height of the parallax data in the horizontal direction of the parallax image, and a third map that shows a minimum height of the parallax data in the horizontal direction of the parallax image.

13. An intersection recognizing apparatus comprising:
a stereo image obtaining unit configured to obtain a stereo image by capturing a forward image in a street by a stereo camera; and
a processor including:
a parallax image generator configured to generate a parallax image based on the stereo image obtained by the stereo image obtaining unit;
a parallax map generator configured to generate a parallax map based on the parallax image;
a feature data storage unit configured to store feature data of an intersection road shoulder width regarding a road surface; and
a recognition processing calculation unit configured to recognize an intersection condition based on the parallax map and the feature data of the intersection road shoulder width,
wherein the recognition processing calculation unit is configured to eliminate, from the parallax map, an object that has been recognized using a difference in height between a map that shows a minimum height of the parallax data in the parallax image and a map that shows a maximum height of the parallax data in the parallax image, configured to extract a plurality of end points from the parallax map from which the recognized object has been eliminated, and configured to compare a distance between the end points with the feature data to recognize an intersection, and wherein the parallax map includes a first map that shows a frequency of parallax data in a horizontal direction of the parallax image, a second map that shows a maximum height of the parallax data in the horizontal direction of the parallax image, and a third map that shows a minimum height of the parallax data in the horizontal direction of the parallax image.

* * * * *